United States Patent [19]

Valette et al.

[11] Patent Number: 5,226,738
[45] Date of Patent: Jul. 13, 1993

[54] PROCESS FOR MAKING A BEARING COLLAR AND BEARING ASSEMBLY EQUIPPED WITH SUCH A COLLAR

[75] Inventors: Michel Valette, Quintal; André Jayr, Annecy, both of France

[73] Assignee: S.N.R. Roulements, Annecy, France

[21] Appl. No.: 754,601

[22] Filed: Sep. 4, 1991

[30] Foreign Application Priority Data

Sep. 4, 1990 [FR] France .............................. 90 10961

[51] Int. Cl.$^5$ .............................................. F16C 33/60
[52] U.S. Cl. ........................................ 384/513; 384/537; 384/544; 384/585
[58] Field of Search ............... 384/513, 537, 544, 585, 384/510

[56] References Cited

U.S. PATENT DOCUMENTS 4,887,917  12/1989  Tröster et al. ....................... 384/537

FOREIGN PATENT DOCUMENTS

| 3418440 | 11/1985 | Fed. Rep. of Germany . |
| 3940395 | 6/1990  | Fed. Rep. of Germany . |
| 2347567 | 9/1978  | France . |
| 2408473 | 6/1979  | France . |
| 2499910 | 7/1986  | France . |
| 2605557 | 4/1988  | France . |
| 2631402 | 11/1989 | France . |
| 2191268 | 12/1987 | United Kingdom . |

*Primary Examiner*—Lenard A. Footland
*Attorney, Agent, or Firm*—Oblon, Spivak, McClelland, Maier & Neustadt

[57] ABSTRACT

Bearing assembly carrying a radial collar (10) for retaining an interior ring element (4) of a bearing having two rows of rolling bodies (2) and which has at least one fastening flange (5), in which the inner face of collar (10) extends axially under ring element (4) by an axial support edge.

6 Claims, 2 Drawing Sheets

PROCESS FOR MAKING A BEARING COLLAR AND BEARING ASSEMBLY EQUIPPED WITH SUCH A COLLAR

BACKGROUND OF THE INVENTION

1. Field of the Invention

The invention relates to a bearing assembly that carries an axial retaining collar of an interior ring of a bearing having two rows of rolling bodies.

2. Discussion of the Related Art

Publication FR-A-2605557 describes a bearing assembly including a collar made by a pressing or forging tool driven by an oscillating movement around the bearing axis so as to radially flare the tubular end of a hub or of a ring during rotation. When the bearing is subjected to axial loads, the thrust forces exerted directly or indirectly on the collar produce forces that can cause the breaking of the collar and the axial ejection of the interior ring.

It has also been found that the pressing and forging forces produced during the process of making the collar generate deformations of the bearing ring.

SUMMARY OF THE INVENTION

The invention has as an object a bearing assembly with a collar of the predefined type formed at the axial end of a bearing ring or of a hub, by pressing or forging by locating a folded zone of appropriate size adjacent to a zone treated thermally to locally increase the hardness of the part carrying the collar.

The invention also has as an object a process for making a collar, for example in contact with an element for putting a ring of the bearing under axial stress to achieve a preloading of the bearing assembly.

The invention, more particularly, applies to bearing assemblies which have at least one fastening flange.

According to a characteristic of the invention, the inner face of the collar extends axially under the interior ring element by an axially extending surface made during the process of shaping the collar.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
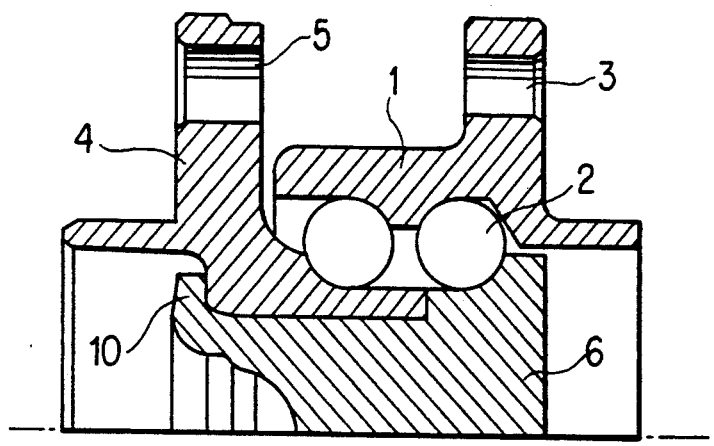
FIG. 1 shows in axial half section, an embodiment of the bearing assembly according to the invention and having two fastening flanges.

In the bearing assembly shown in FIG. 1, exterior ring 1 of the bearing, with two rows of rolling bodies, has a fastening flange 3 and two interior bearing tracks for the rolling bodies.

An interior ring element 4 also has a fastening flange 5 and is mounted on another, lower, interior ring element 6. The axial end of lower element 6 has a collar 10. The collar 10 is made from a blank 10' whose blank section is shown in broken lines in FIGS. 3 (and in an alternative embodiment, in FIG. 4). The collar 10 can also function as a functional support zone of a transmission seal part.

Figure 2:
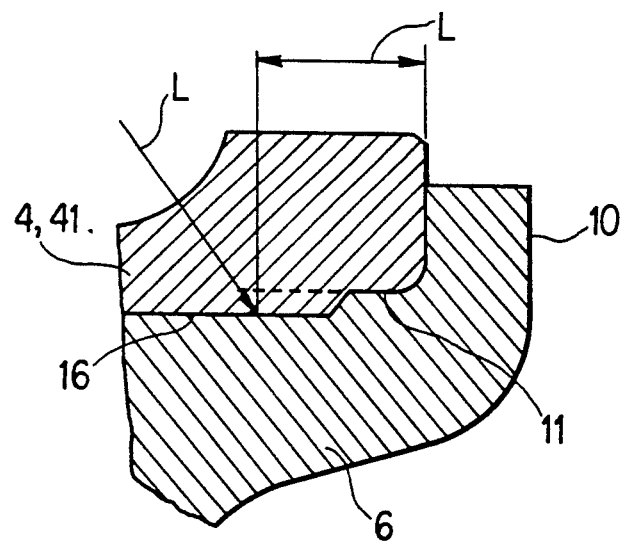
FIG. 2 shows, on a larger scale, the retaining collar of a ring element.
Figure 5:
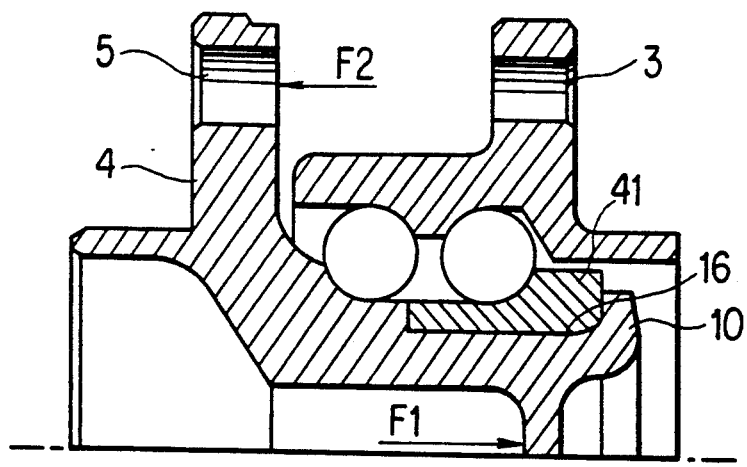
FIG. 5 shows, in axial half section, an embodiment of the bearing assembly in which the collar is located on the interior ring.
Figure 6:
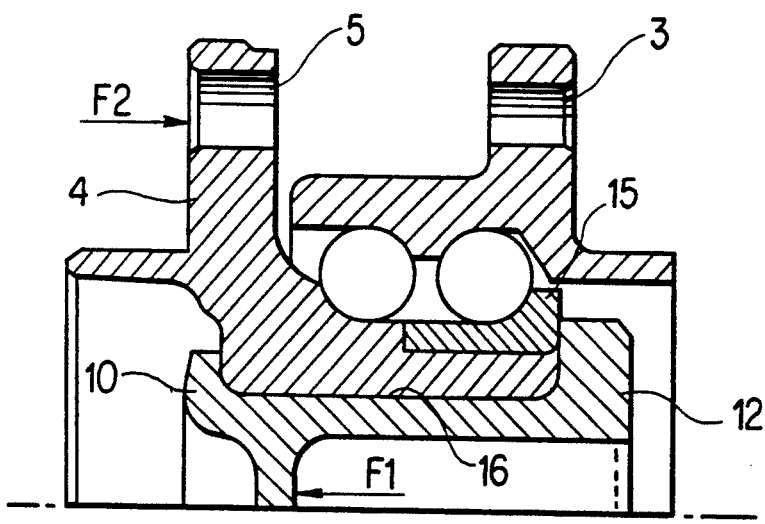
FIG. 6 shows, in axial half section, an embodiment of the bearing assembly in which the collar is located on a support of the interior ring.
Figure 7:
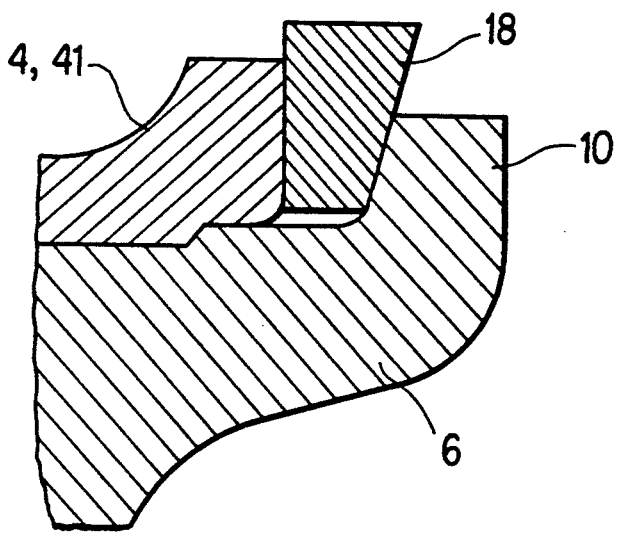
FIG. 7 is a detail showing the collar in contact with a preloading ring of the bearing.

FIG. 2 shows the axial retaining means of an interior or main ring element 4 such as that shown in FIGS. 1 or 6, or of another interior ring element such as 41 shown in FIG. 5. For this purpose, the inner face of collar 10 extends axially under ring element 4 or 41 which has a folded part to form a distal end of larger inner diameter. The constituent material of collar 10 in contact with the element of ring 4 or 41 is deformed during the process of shaping the collar 10, thereby making an axial support edge 11 on element 6. The axial support edge abuts the ring element to axially retain the ring element.

To prevent the deformation of element 4 of the interior ring during the shaping of collar 10, collar 10 and particularly its support zone are located approximately in the same radial plane as is the fastening flange 5 which radially extends element 4 of the interior ring.

In FIG. 6 the collar 10 is carried by an assembly pin 12 abutting a ring element 15 added onto element 4, which makes it possible to separate the two bearing tracks from the rows of rolling bodies.

Figure 3:
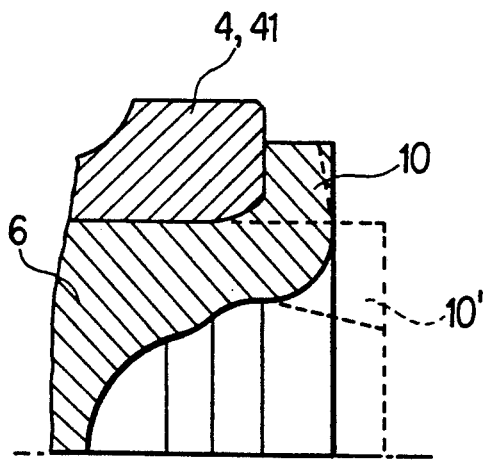
FIGS. 3 and 4 are details of the collar, showing its blank shape according to two variant embodiments.
Figure 4:
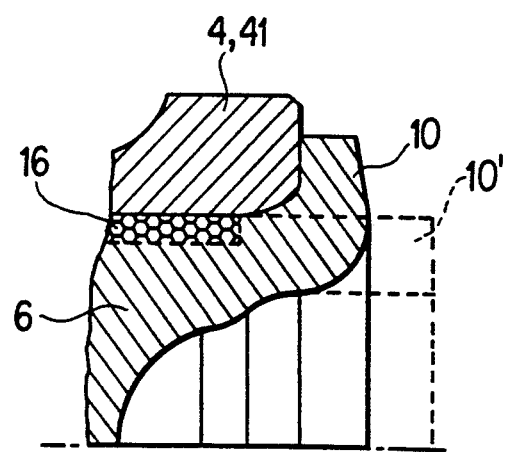

To facilitate the construction of collar 10, the deformation zone is located on the end of element 6 (FIG. 1), of ring element 4 (FIG. 5) or on pin 12 (FIG. 6). To do this, the corresponding end of the respective element 6, 4 or 12 is dimensioned in thickness as shown in FIGS. 3 and 4. It is also possible to facilitate the shaping of the collar such as 10 by causing, for example, interior element 6 to undergo a suitable hardening heat treatment at a bearing surface zone 16 which supports the other element 4, 41 of the interior ring and which axially extends to the axial support edge of collar 10.

To facilitate the crimping of ring element 4, 41—by the shaping of the collar—the corresponding end of ring element 4 or of pin 12 is folded at an appropriate dimensional proportion of the useful section of ring 4 or of pin 12.

During the process of shaping collar 10, a certain axial stress is applied on the bearing by collar 10. In this case, collar 10 is carried by an element that is nonturning and located outside the line of contact of the rolling bodies and at a distance L from bearing surface 16 under load (FIG. 2).

According to a first process of making the collar on the bearing assembly previously put under axial stress, elastic elongation of the ring element 4 (FIG. 5) or of pin 12 (FIG. 6) is performed by application of opposite forces F1, F2 which put the bearing element under elastic stress before the application of the shaping tool for the collar.

According to another process and prior to the shaping of the collar, elongation of element 4 or 12 carrying the collar is performed by heating the element to between 200° to 300° C.

According to another variant of the process, a support ring 18 of appropriate section is used on ring element 4 or 41 which is fastened to collar 10. Ring 18 is heated to a temperature between 200° and 300° C. and mounted on bearing element 4 or 12 before shaping of the collar. The heating of ring 18 can be performed during the shaping of the collar. During cooling of the ring, its diameter decreases. Shrinking of the ring creates an axial load on the bearing whose magnitude can be adjusted by controlling the expansion of the ring.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bearing assembly comprising:
    an exterior ring element;
    an interior ring element having a zone adjacent a distal end whose outer diameter is greater than an outer diameter of a remainder of said interior ring element, said zone forming an axial abutting surface;
    rolling bodies supported between said ring elements;
    a radially extending collar being formed on and including an element having an axially extending surface which is deformed so as to engage said axial support surface and further axially retaining said interior ring element; and
    a fastening flange formed on said interior ring element, said collar being in substantially the same radial plane as said fastening flange.

2. The bearing assembly of claim 1 wherein said element on which said collar is formed is axially prestressed.

3. The bearing assembly of claim 1 wherein said axially extending surface is surface hardened.

4. The bearing assembly of claim 1 including a support ring positioned between said collar and interior ring element.

5. The bearing assembly of claim 1 including a pin element interior of said interior ring element, wherein said element on which said collar is formed in said pin.

6. The bearing assembly of claim 1 wherein said collar is formed by heating said element on which said collar is formed to between 250° C. and 300° C., followed by applying a shaping tool to form the collar.

* * * * *